United States Patent
Mathieu

(10) Patent No.: US 9,192,087 B2
(45) Date of Patent: Nov. 24, 2015

(54) HAND-MANIPULATED, DIRT TOOL WITH AT LEAST THREE, WORKING, OUTWARDLY-DIRECTED, SIDE EDGES

(75) Inventor: Daniel Joseph Mathieu, Windsor, CT (US)

(73) Assignee: Glorious Outdoors, LLC, Windsor, CT (US)

(*) Notice: Subject to any disclaimer, the term of this patent is extended or adjusted under 35 U.S.C. 154(b) by 197 days.

(21) Appl. No.: 12/462,377

(22) Filed: Aug. 3, 2009

(65) Prior Publication Data

US 2010/0051297 A1    Mar. 4, 2010

Related U.S. Application Data

(60) Provisional application No. 61/190,784, filed on Sep. 2, 2008.

(51) Int. Cl.
*A01B 1/02* (2006.01)
*A01B 79/00* (2006.01)

(52) U.S. Cl.
CPC ........................ *A01B 1/02* (2013.01)

(58) Field of Classification Search
USPC .......... 294/49, 54.5, 51, 60, 50.6, 50.7; D8/9, D8/10; 172/114, 116, 371, 381, 378; 30/315, 172; 7/116; 254/131.5, 13
See application file for complete search history.

(56) References Cited

U.S. PATENT DOCUMENTS

| | | | |
|---|---|---|---|
| 83,071 A * | 10/1868 | Linnemann | 7/116 |
| 648,321 A * | 4/1900 | Westerberg | 294/49 |
| 680,275 A | 8/1901 | Phillips | |
| 1,027,345 A * | 5/1912 | Lapin | 294/49 |
| 1,124,046 A | 1/1915 | Lopez et al. | |
| D52,583 S | 10/1918 | Palombo | |
| 1,908,735 A * | 5/1933 | Donaldson | 30/315 |
| 2,937,046 A | 5/1960 | Olvey | |
| 3,226,149 A * | 12/1965 | McJohnson | 294/50 |
| 3,767,249 A | 10/1973 | Rogers | |
| 3,848,915 A | 11/1974 | Wherry | |
| 4,718,708 A | 1/1988 | Zacuto | |
| D332,555 S | 1/1993 | Hagerman | |
| D353,308 S * | 12/1994 | Spengler et al. | D8/10 |
| 5,503,445 A * | 4/1996 | Fontaine | 294/60 |
| D397,279 S * | 8/1998 | Rich et al. | D8/10 |
| 5,951,077 A | 9/1999 | Dahill | |

(Continued)

OTHER PUBLICATIONS

Unpublished, Contents of Searcher's Report Letter of Mar. 13, 2009 (original pp. 1-4; enclosed "Contents" is 5 pages).

*Primary Examiner* — Paul T Chin
(74) *Attorney, Agent, or Firm* — Daniel N. Smith

(57) ABSTRACT

A hand-manipulated dirt tool, either a spade, shovel, post hole digger or the like, is driven and guided by the hands and feet of the human user, which tool has at least three, operative, outwardly-directed, side edges, preferably continuous, namely, a penetrating chamfer, a slicing edge and a chopping chamfer, preferably at at least two different angles and three sizes, either on one side or on both sides. Thus, at least two, outwardly-directed, side edges are chamfer, which can be parallel, with relatively small, entry surface in beginning edge of the tool and, if spade or a shovel, etc., a foot engaged, top portion is provided. Ideally the three side surfaces, as one progresses up the tool, can make forty-five, seventy-five and forty-five degrees to the rear and ideal "vertical" distances of one, nine and one inches, respectively, and exemplary degree, distance ranges and cross-sectional dimensions are also provided.

21 Claims, 5 Drawing Sheets

(56) References Cited

U.S. PATENT DOCUMENTS

| | | |
|---|---|---|
| 6,338,511 B1 | 1/2002 | Douglas et al. |
| D569,698 S | 5/2008 | Baker |
| D570,653 S * | 6/2008 | Baker ............................ D8/10 |
| D579,288 S | 10/2008 | Baker |
| D588,882 S * | 3/2009 | Baker, II .......................... D8/10 |
| D606,817 S * | 12/2009 | Boies ............................... D8/10 |
| 2007/0284123 A1 | 12/2007 | Lee |
| 2008/0309106 A1 * | 12/2008 | Baker ............................. 294/49 |

* cited by examiner

HAND-MANIPULATED, DIRT TOOL WITH AT LEAST THREE, WORKING, OUTWARDLY-DIRECTED, SIDE EDGES

REFERENCE TO RELATED APPLICATION

This application is a utility patent application based on the inventor's prior U.S. provisional patent application Ser. No. 61/190,784 filed Sep. 2, 2008, entitled generally "Spear Head™ spade for digging and transplanting in difficult soil conditions," the disclosure of which is incorporated herein by reference.

BACKGROUND

1. Field of Invention

The present invention relates generally to a dirt tool (a spade or a shovel or a post hole digger which classically has two extended handles, and like dirt tools, etc.), each dirt tool manipulated by the human user by hand, for digging in dirt by hand with the tool, and more particularly to one in which there are at least three (3), different, side edges outwardly-directed, either on both sides as described and illustrated or only on one side, and all of those dirt tools are within the inventive concept herein disclosed. Thus, at least the three (3), operative, outwardly-directed, side edges, preferably continual or continuous, namely, a penetrating chamfer, a slicing edge and a chopping chamfer, preferably at at least two different angles and sizes, preferably three (3) different sizes, either on one side or on both sides as illustrated. Thus, at least two, outwardly-directed, side edges are chamfer, and between them ideally there is a slicing edge, with, for example, a relatively small, entry surface in the beginning.

All, or mostly all, is disclosed at different importance levels in the present invention, along with the three side angles and the exemplary sizes of the three operative sides, and the exemplary size of the entry bottom, etc., among other innovative structural features found in the present invention.

Thus the phrase "dirt tool" as used herein also includes a spade, a shovel, a post hole digger, and like dirt tool, etc., working in dirt and held by hand, through which dirt one must dig to do useful work.

2. Prior Art

As shown by the patentability search conducted herein, a spade or shovel working in and through dirt by hand, broadly speaking, is well known. But none noted have at least the three (3), operative, outwardly-directed, side edges, preferably continual or continuous, namely, a penetrating chamfer, a slicing edge and a chopping chamfer, preferably at at least two different angles and sizes, either on one side or on both sides. Thus, at least two, outwardly-directed, side edges are chamfer, and between them ideally there is a slicing edge, with, for example, a downwardly-directed, relatively small, entry surface in the beginning.

All, or mostly all, is disclosed at different importance levels in the present invention, along with the three side angles and the sizes of the three operative sides, and the size of the entry bottom, etc., among other innovative, structural features found in the present invention.

OBJECTS AND ADVANTAGES

The exemplary dirt tool (the spade, as well as the shovel, each having usually a single, centrally located handle, and the two handle post hole digger, and like dirt tools, etc.) of the invention is used by hand to go through dirt and, among other things, make an opening in the dirt by hand using the hand tool of the present invention.

Other objects and advantages are disclosed in the specification hereof.

GENERAL DISCUSSION OF THE INVENTION

The dirt tool of the present invention (a spade, a shovel, a post hole digger, and like dirt tool, etc.) is worked directly by human hands holding at least one handle working in dirt and making at least an opening or at least a hole in it by hand using the hand tool of the present invention. On at least one side of the dirt tool are three (3), outwardly-directed, not necessarily continuous or directly connected but ideally so, side edges, namely, a penetrating chamfer and a chopping chamfer and ideally between them a slicing edge. Ideally both sides are the same, as illustrated, but they could be different, and ideally they have at the bottom, entry edge a chisel point.

Each side ideally has a penetrating chamfer of about or exactly one (1") inch to about or exactly three (3") inches (more ideally about or exactly one inch) in "vertical" length, with the penetrating chamfer making an angle of about or exactly thirty (30°) to about or exactly seventy (70°) degrees to the rear from the initial entry surface (more ideally an angle of about or exactly forty-five degrees) from the "horizontal," all as shown in FIG. 1A. The slicing edge is about or exactly six (6") inches to about or exactly twenty-four (24") inches (more ideally about or exactly nine inches) in "vertical" length, with its connecting point with the penetrating chamfer making an angle of about or exactly forty-five (45°) degrees to about or exactly eighty-five (85°) degrees (more ideally an angle of about or exactly seventy-five degrees) from the "horizontal" to the rear of the dirt tool.

The slicing edge can be compound, that is, having multiple angles, for example, about or exactly seventy-five degrees and about or exactly eighty-one degrees, but at least all ideally are outwardly directed or at least a significant one or more, if not all, are outwardly directed.

The chopping chamfer is about or exactly one (1") inch to about or exactly three (3") inches (more ideally about or exactly one inch) in "vertical" length, with the chopping chamfer making an angle of about thirty (30°) degrees to about seventy (70°) degrees from the "horizontal" to the rear from the slicing edge (more ideally an angle of about or exactly forty-five degrees), all again as shown in FIG. 1A. Thus, the two chamfer edges can have the same angularity, if so desired, that is, they are parallel, as illustrated.

As a secondary matter the entry chisel point of the spade can be about a half inch to about two (~0.5" to ~2") inches in length, ideally for durability of the point, and "horizontal" or zero (0°) degrees in its angularity. It also can have the same dimensions as a full radius and that is also possible.

The initial prototypes had about a thirty to forty (~30 to ~40) degree ground edge typically to serve as cutting surfaces on all edges. Ideally the side edges can have different types of sharpening for specific purposes.

For example, beyond simple, about thirty to about forty (30-40) degree ground edges, for further example, serrated and saw tooth are also envisioned. These can be on only one side and not the other. Spade blades and edges can be of uniform thickness (for example, 0.065 to 0.125 inch thickness) or vary in thickness in the same range according to where strength and specific properties are most desirable. Metal for spades is typically carbon steel but could also be bi-metal, etc. Edges can also have carbide teeth and titanium coatings, etc.

The "horizontal" or cross dimensions of FIG. 1A (also FIG. 1) for a spade is typically about or exactly two inches to about or exactly six (~2" to ~6") inches, about or exactly five inches to about or exactly seventeen (~5" to ~17") inches, and about or exactly seven inches to about or exactly twenty-one (~7" to ~21") inches. Of course, the smaller for one dimension, typically the smaller will be the other dimension, and the smaller will be the third dimension; and likewise the larger, etc.

The "horizontal" or cross dimensions of FIG. 1B (also FIG. 1) for a spade is typically about or exactly half (0.5") inch to about or exactly two (2") inches, two inches to about or exactly six (~2" to ~6") inches, about or exactly five inches to about or exactly seventeen (~5" to ~17") inches, and about or exactly seven inches to about or exactly twenty-one (~7" to ~21") inches. Of course, the smaller for one dimension, typically the smaller will be the other dimension, and the smaller will be the third dimension; and likewise the larger, etc.

Ideally the angles and over-all edge profile are especially important in determining the ease of soil penetration. Also, the entire side profile can be prescribed to be curvilinear with all side edges directed-outwardly.

As noted above, the phrase "dirt tool" as used herein includes a spade, a shovel, a post hole digger, etc., or like dirt tool, manipulated by hand and working in dirt using at least three (3), different, outwardly directed, side edges digging through the dirt, although the two chamfer surfaces could have the same angularity, that is, be parallel, if so desired.

The initial embodiment of the invention, as generally disclosed in the provisional application, is a special spade/shovel designed to make digging and transplanting easier and more effective, especially in dense or rocky soils. It ideally is also easier and more effective at digging and transplanting highly fibrous or rooted plants.

It ideally allows the penetration, cutting, and or slicing of any obstacle softer than the hardened blade (i.e. roots, grasses, wood, etc.), when, for example, the full weight of a person is applied to the foot rest(s) of the spade.

It ideally features a heat treated and hardened metal blade that allows several special sharpened cutting surfaces/edges to be maintained and ideally to prevent excessive bending and cracking of the spade.

The ideal means of making this blade are those currently used to make high quality shovels and spades, such as forging and metal forming machines, but ideally with the addition of heat treating and grinding for rendering sharp edges.

The ideal main features that distinguish the spade/shovel from any other on the market ideally are its special profile that allow the easy penetration into difficult soil conditions, multiple specialized hardened cutting surfaces, and a much improved extraction leverage ratio (ideally due to a smaller effective surface area versus the lever arm length compared to a typical spade/shovel).

Ideally the cutting surfaces can be altered in number and shape to fit particular needs. The drawings show ideal examples of four (4) different cutting surfaces, namely, ideally:

a sidewardly-directed, initial, penetrating chamfer;
a mid, sidewardly-directed, slicing edge; and
a sidewardly-directed, top, chopping chamfer;
and, even more ideally,
a bottom, downwardly-directed, chisel point.

Also, for example, beyond simple, about thirty to about forty (30-40) degree ground edges, for further example, serrated and saw tooth are also envisioned. These can be on only one side and not the other. Spade blades and edges, for example, can be of uniform thickness (0.065 to 0.125 inches thickness) or vary in thickness in the same range according to where strength and specific properties are most desirable. Metal for spades is typically carbon steel but could also be bi-metal, etc. Edges can also have carbide teeth and titanium coatings, etc.

Ideally all of these features in combination allow people who are weaker or smaller than average to do digging and transplanting tasks that would normally require a much stronger person to do. It ideally also prevents spade/shovel shafts from breaking due to excessive bending forces.

The latest prototype ideally was made by cutting or grinding a high quality, heat treated carbon steel spade/shovel to get the tapered shape seen in the diagrams and then grinding the cutting surfaces described.

The sharpening ideally can be done using existing sharpening techniques and machinery for knives and chisels.

Ideally the edges can be an integral part of the blade or as separately replaceable or non replaceable inserts.

DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

DETAILED DESCRIPTION OF AN EMBODIMENT

Figure 1:
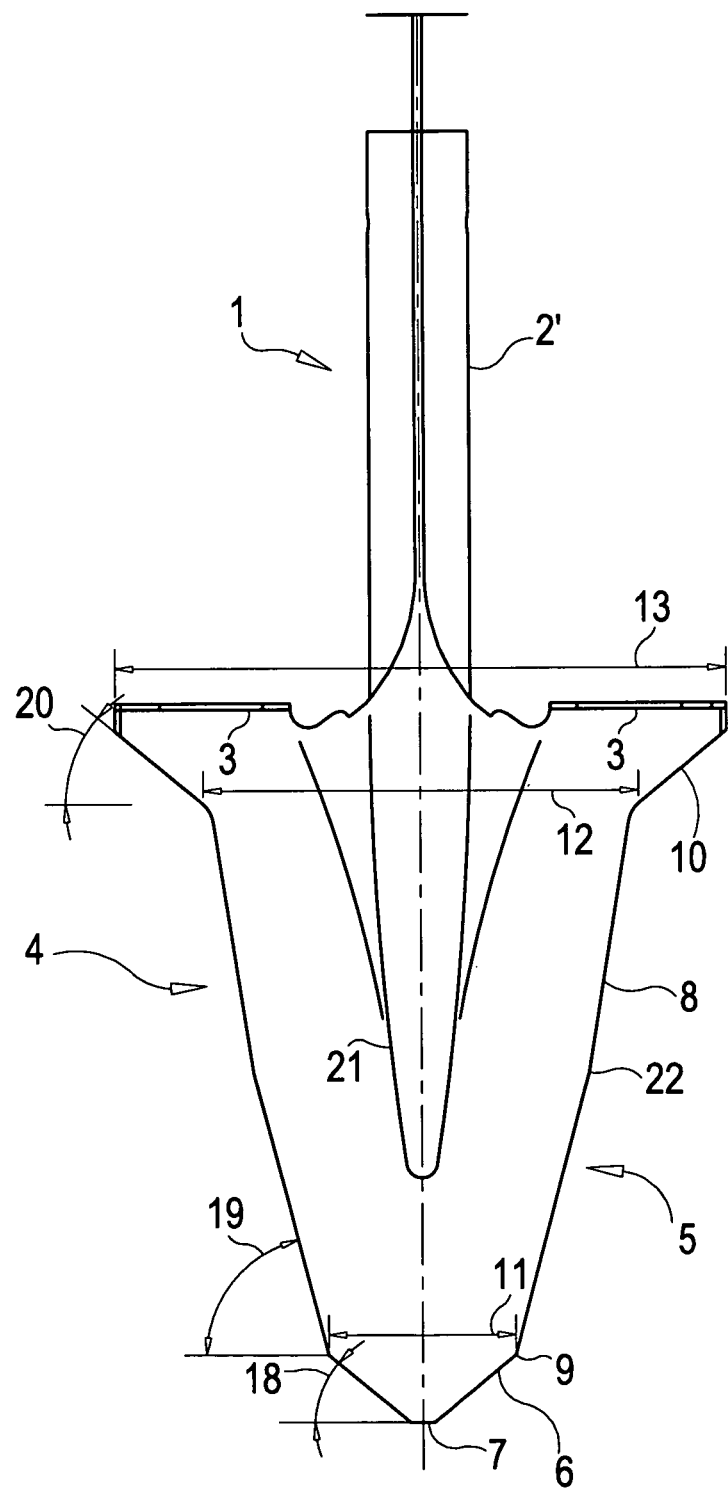
FIG. 1 is a top view, showing the exemplary, current embodiment of the spade of FIG. 1A, but more complete in its view, including both the metal top of the spade, that is, its operative blade and its top connecting part for the handle.
Figure 2:
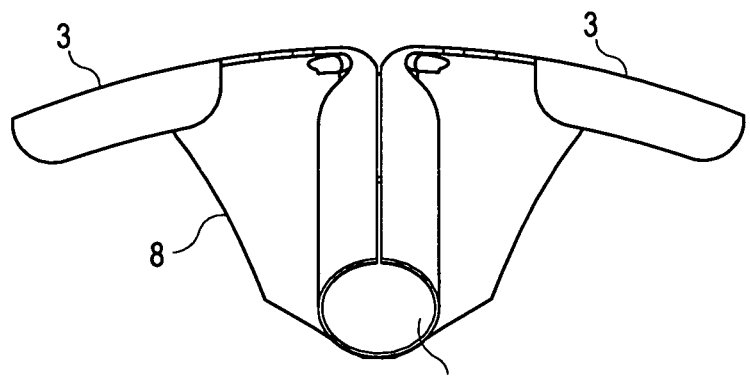
FIG. 2 is a back-end view of the exemplary spade of FIG. 1.
Figure 3:
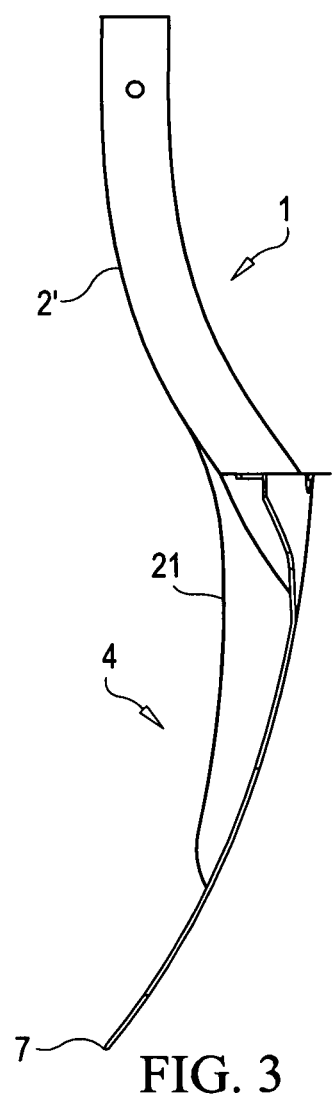
FIG. 3 is a side, cross-sectional view of the center of the exemplary spade of FIG. 1.

| Element | Ref. No. | Figure(s) |
| --- | --- | --- |
| spade | 1 | (FIGS. 1 and 3) |
| handle | 2 | (FIG. 4) |
| handle socket | 2' | (FIGS. 1 and 3) |
| foot rests | 3 | (FIGS. 1, 2 and 4) |
| working piece (blade) | 4 | (FIGS. 1, 1A, 3 and 4) |
| either side | 5 | (FIGS. 1 and 1A) |
| penetrating chamfer | 6 | " |
| entry chisel point | 7 | (FIGS. 1, 1A and 3) |
| alternate entry chisel point | 7' | (FIG. 1B) |
| slicing edge | 8 | (FIGS. 1, 1A and 2) |

-continued

| Element | Ref. No. | Figure(s) |
| --- | --- | --- |
| connecting point | 9 | (FIGS. 1 and 1A) |
| chopping chamfer | 10 | " |
| lower-most line | 11 | (FIGS. 1 and 1A) |
| mid-line | 12 | " |
| upper-most line | 13 | " |
| user's hands | 14 | (FIG. 4) |
| user's legs | 15, 15' | " |
| (15' - user's leg on foot rest 3) | | |
| flowering bush | 16 | " |
| (to be planted for exemplary purposes) | | |
| exemplary human user | 17 | " |
| first, lowermost angle | 18 | (FIGS. 1 and 1A) |
| second, middle angle | 19 | " |
| third, uppermost angle | 20 | " |
| spine | 21 | (FIGS. 1, 1A & 3) |
| angular change point | 22 | (FIG. 1) |

Exemplary Description of Spade+(FIGS. 1-4)

The exemplary dirt tool is a spade 1 (or, alternatively, a shovel, a two handle post hole digger, etc., or other like dirt tool) hand manipulated by the human user using, for example, the handle 2 (see FIG. 4) of the dirt tool to manipulate the tool through the dirt and intermittently his/her legs 15, 15' to push on the folded or otherwise attached, foot rests 3. However, the details of the handle 2 or the details of how it is centrally connected to the spine 21 (see FIGS. 1 & 3) toward the top of the spade's working part or blade 4 are not part of the invention. Even though the handle details of the tool are not part of the invention, they are part of the exemplary embodiment and are shown in the drawings.

Figure 4:
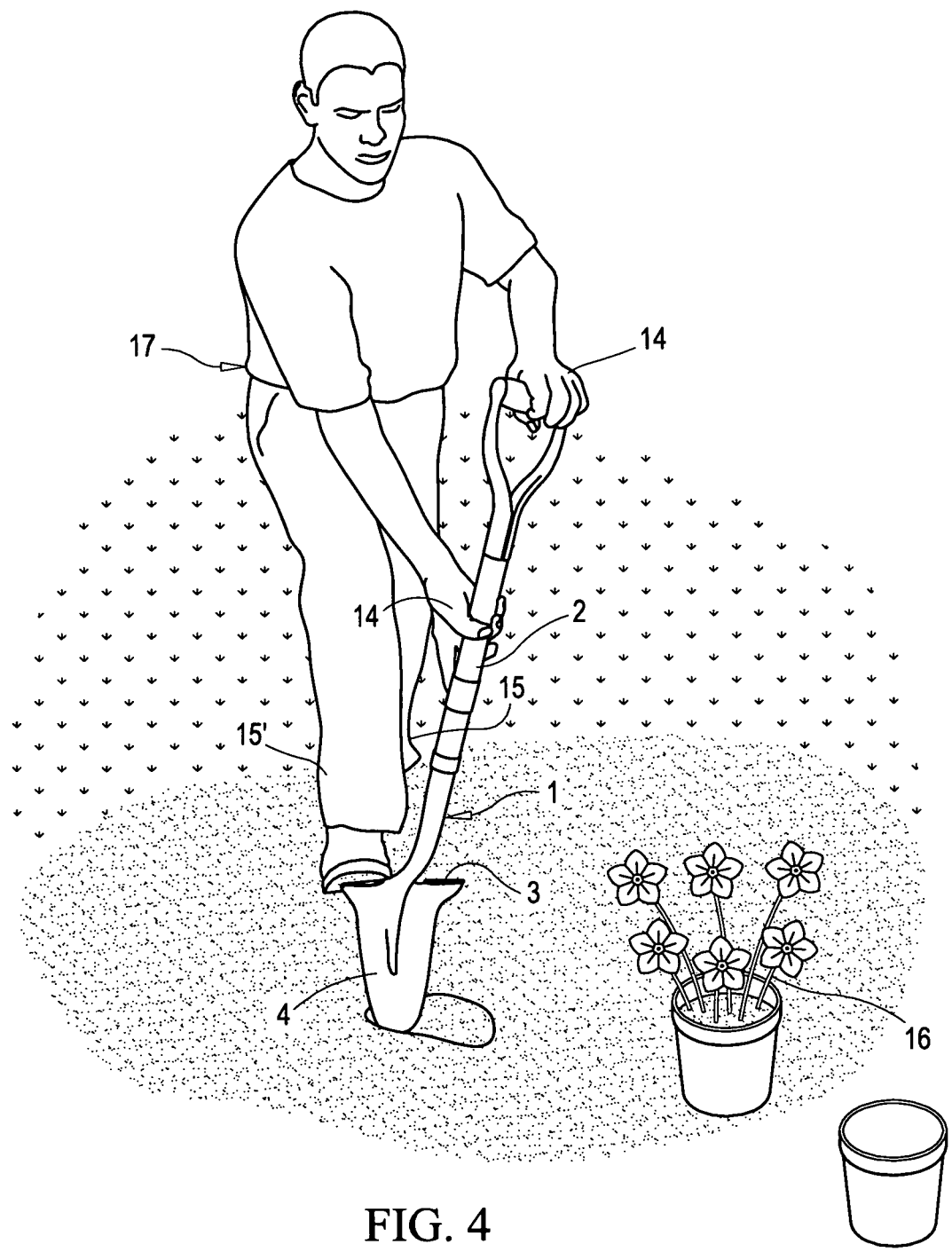
FIG. 4 is a perspective view of the exemplary blade of FIG. 1A and the embodiment of the spade of FIGS. 1-3, but shown with a handle in actual use digging in the dirt by the human user making an opening in the dirt for, for example, planting.

The handle 2 can be the shorter version (as shown in FIG. 4) or the longer version. The overall length of the spade 1 from the forward tip of the working piece or part 4 to the top of the handle 2 is, for example, about or exactly thirty-six inches to about or exactly forty (~36" to ~40") inches typical for the "D" handle type short spades and about or exactly fifty-six inches to about or exactly sixty (~56" to ~60") inches for the straight shaft, relatively long spades.

Figure 1A:
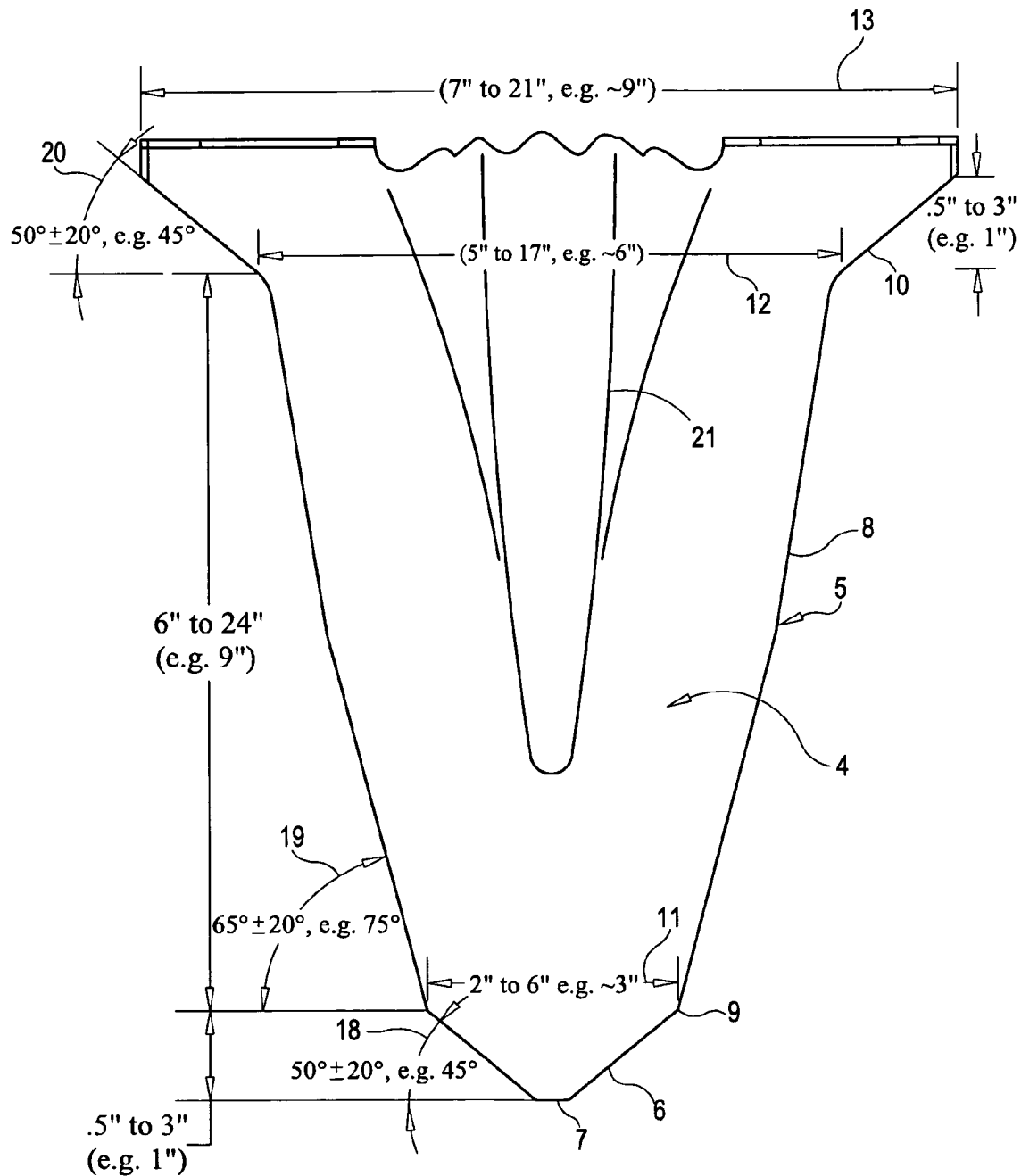
FIG. 1A is a top, relatively close-up view of the blade of the hand-manipulated, dirt tool, in this drawing a spade, that represents the current embodiment of the present invention, that, among other things, clearly shows the exemplary angles and dimensions of the side surfaces.
Figure 1B:
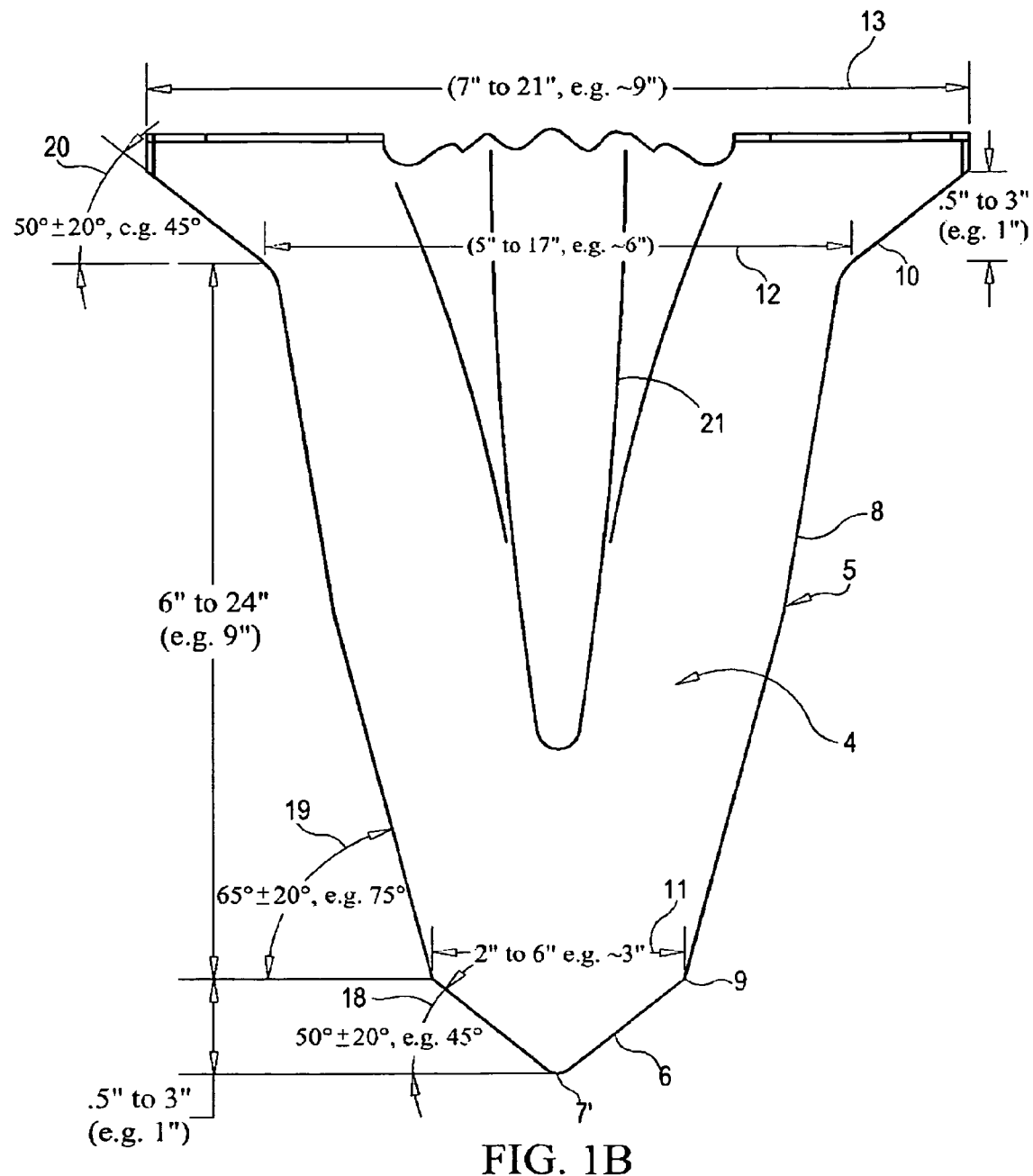
FIG. 1B also is a top, relatively close-up view of the blade of the hand-manipulated, dirt tool, in this drawing a spade, that represents the current embodiment of the present invention, among other things, that clearly shows the exemplary angles and dimensions of the side surfaces, with the bottom entry surface being curved.

Each side 5 ideally has a penetrating chamfer 6 of about or exactly one (~1") inch to about or exactly three (~3") inches (more ideally about one-and-a-half inches) in "vertical" length, with the penetrating chamfer making an angle of about thirty (~30°) degrees to about seventy (~70°) degrees to the rear from the initial entry surface 7 for the lowermost angle 18 (more ideally about or exactly an angle of forty-five degrees), all as shown in FIG. 1A. The slicing edge 8 is about or exactly six (~6") inches to about or exactly twenty-four (~24") inches (more ideally about or exactly nine inches) in "vertical" length, with its connecting point 9 with the penetrating chamfer making an angle of about or exactly forty-five (~45°) degrees to about or exactly eighty-five (~85°) degrees for the mid-angle 19 (more ideally an angle of or exactly seventy-five degrees) to the rear.

The slicing edge 8 can be compound, that is, having multiple angles, for example, the different angle point 22 marking the change from an angle of, for example, seventy-five degrees to about eighty-one degrees as one goes up.

The chopping chamfer 10 is about or exactly one (~1") inch to about or exactly three (~3") inches (more ideally about or exactly one-and-a-half inches) in "vertical" length, with the chopping chamfer making an angle of about or exactly thirty (~30) degrees to about or exactly seventy (~70°) degrees to the rear from the slicing edge 8 making an angle 20 (more ideally an angle of about or exactly forty-five degrees), all again as shown in FIG. 1A. Thus, the two, side, chamfer edges 6, 10 can have the same angularity, that is, be parallel to one another, if so desired.

As a secondary matter the entry chisel point or area or surface 7 can be about or exactly a half inch to about exactly two (~0.5" to ~2") inches in length, ideally for durability of the point, and ideally "horizontal" or zero (0°) degrees in its angularity. It also can have the same dimensions as a full radius and that is also possible.

The initial prototypes have about or exactly a thirty to forty (~30 to ~40) degree ground edge typically to serve as cutting surfaces on all edges. Ideally the side edges can have different types of sharpening for specific purposes.

For example, beyond simple, about thirty to about forty (30-40) degree ground edges, for further example, serrated and saw tooth are also envisioned. These can be on only one side and not the other. Spade blades and edges can be of uniform thickness (for example, 0.065 to 0.125 inch thickness) or vary in thickness in the same range according to where strength and specific properties are most desirable. Metal for spades is typically carbon steel but could also be bi-metal, etc. Edges can also have carbide teeth and titanium coatings, etc.

The "horizontal" or cross dimensions of FIG. 1A (also FIG. 1) for a spade are typically about or exactly two inches to about or exactly six (~2" to ~6") inches for the lower-most line 11, about or exactly five inches to about or exactly seventeen (~5" to ~17") inches for the mid-line 12, and about or exactly seven inches to about or exactly twenty-one (~7" to ~21") inches for the third, upper-most line 13. Of course, the smaller for one dimension, typically the smaller will be the other dimension, and the smaller will be the third dimension; and likewise the larger for one dimension, etc.

Ideally the angles and over-all edge profile are especially important in determining the ease of soil penetration.

Exemplary Application of Spade+(FIG. 4)

An exemplary application of the embodiment or spade 1 is shown in FIG. 4, including the handle 2, with the user's engaging hands 14 and feet 15, 15' also clearly shown. As the gardening work continues, an exemplary planting of a flowering bush 16 not yet planted is shown on the right hand side.

The human user 17 is digging a hole through the dirt using his feet 15, 15' (the latter 15' on the spade projections or foot rests 3 to, for example, force the spade down) and hands 14 on the dirt tool, namely, the (short) spade 1.

The chisel point ideally eases primary entry. The penetrating chamfer ideally allows the spade to wedge itself through any soil condition. The slicing edge ideally cleanly slices through, for example, roots and fibrous plants and facilitates deep penetration. Ideally the chopping chamfer can cut through, for example, large surface roots. The exemplary hardened and tempered steel blade, for example (a) prevents breakage, and (b) retains sharpness longer.

Ideally the deep spine, for example, strengthens the blade.

The benefits of the extremely sharp and effective spade include, for example, the following. It ideally makes possible what was previously impossible or very difficult. It ideally takes, for example, about forty to eighty (~40% to ~80%) percent less in penetration effort (especially in rocky, rooted, & dense soils). It ideally reduces, for example, stress on the shaft and the handle to help prevent spade or shaft breakage.

It ideally takes, for example, about forty to about sixty (~40% to ~60%) percent less effort to lever and transfer soil or plants out of the ground. It ideally makes, for example, gardening chores much easier for all, but it ideally is especially useful for women, elderly, or people who are lighter or not as capable. The ideal specialized cutting surfaces, for example, make this the go-to-tool for transplanting.

Also, for further example, besides a shovel and as noted above, the general design of the blade could also be applied to a hand manipulated post hole digger.

It is noted that, in preparing the foregoing, "vertical" and "horizontal" were put in quote marks to signify that they rely on the spade being properly aligned and they are used in a relative sense. Also, as was noted before, the phrase "dirt tool" as used herein includes a spade, shovel, a post hole digger or like dirt tool implement, unless otherwise noted, and is driven and guided by the hands of the human user.

The embodiment and exemplary application described herein generally and/or in detail were for exemplary purposes and are, of course, subject to many different variations. Because many varying and different embodiments and applications may be made within the scope of the inventive concept(s) herein taught, and because many modifications may be made in the embodiment and application herein detailed in accordance with the descriptive requirements of the law, it is to be understood that the details herein generally are to be interpreted as illustrative and not in a limiting sense.

What is claimed is:

1. A hand-manipulated dirt tool selected from the group consisting of a spade, a shovel, a post hole digger, and like dirt tools for making an opening in, chopping, and removal of soil from the ground by directly hand guiding the tool, comprising:
   (A) a vertically extending handle having a grip positioned about one end thereof whose opposite end is fixedly engaged with a spine forming part of a working piece;
   (B) said working piece comprising a spine, an upper portion, a middle portion, and a lower portion:
      (i) said spine being centrally located and aligned along a vertical line of said working piece for fixedly receiving said handle, wherein said spine extends downwardly into said working piece at least a third of the length of the working piece;
      (ii) said upper portion extending upwardly from said middle portion and defining a chopping chamfer consisting of a pair of side edges, each side edge extending upwardly and outwardly from the respective side edges of said middle portion at an angle of from about thirty degrees to about seventy degrees relative to a horizontal line perpendicular to the vertical line of said working piece; said upper portion further consisting of a top portion defining a horizontally extending foot rest located about the top of each of said side edges; the height of said chopping chamfer being about one-half inch to about three inches;
      (iii) a bottom portion connected to said middle portion and defining a penetrating chamfer having a pair of side edges, each extending upwardly and outwardly at an angle of about thirty degrees to about seventy degrees relative to a horizontal line perpendicular to the vertical line of said working piece, from an entry portion located at the bottom of said working piece; said entry portion defining a chisel point for making initial contact with entry into, and making an opening in the soil; the height of said penetrating chamfer being about one-half inch to about three inches height;
      (iv) a middle portion disposed between and connected with said upper portion and said bottom portion of said working piece, said middle portion defining a slicing edge consisting of a pair of side edges, each located on either side of said spine and extending upwardly and outwardly from the side edges of said penetrating chamfer to the side edges of said chopping chamfer at an angle of from about thirty degrees to about eighty five degrees relative to a horizontal line perpendicular to the vertical line of said working piece; the height of said slicing edge being about six inches to about twenty four inches;
   (C) wherein (i) each of the side edges of said penetrating chamfer, slicing edge and chopping chamfer are continuous and directed outwardly from the vertical line of said working piece; (ii) the widest width of said upper portion is greater than the widest width of said middle portion, and the widest width of said middle portion is greater than the widest width of said lower portion; (iii) the ratio of the widest width of said upper portion to the total height of said working piece is from 0.7 to 1.0; and
   (D) said working piece and the spine define a side profile configuration that is curvilinear such that the working piece and spine curve outwardly away from the handle from the upper portion to the bottom portion of the working piece.

2. The dirt tool of claim 1, wherein
   (a) said side edges of said penetrating chamfer extend upwardly and outwardly at an angle of about forty-five degrees;
   (b) said side edges of said slicing edge extend upwardly and outwardly from the side edges of said penetrating chamfer at an angle of about seventy-five degrees;
   and (c) said side edges of said chopping chamfer extend upwardly and outwardly at an angle of about forty-five degrees.

3. The dirt tool of claim 1, wherein said dirt tool comprises at least two parallel chamfers having the same angularity.

4. The dirt tool of claim 1, wherein the width dimensions of the working piece are as follows:
   (a) about two to about six inches at the connection between said penetrating chamfer and said slicing edge;
   (b) about five to about seventeen inches at the connection between said slicing edge and said chopping chamfer; and
   (c) about seven to about twenty-one inches at the top portion of said upper portion.

5. The dirt tool of claim 1, wherein the horizontal width of the chisel point is linear.

6. The dirt tool of claim 5, wherein the horizontal ends of said chisel point make about a forty-five degree angle with the side edges of its adjacent penetrating chamfer.

7. The dirt tool of claim 1 wherein said chisel point is curved.

8. The dirt tool of claim 7, wherein the curvature of said chisel point defines a radius having an arc that joins both side edges of said penetrating chamfer.

9. The dirt tool of claim 1, wherein the width dimensions of the working piece are as follows:
   (a) about a half inch to about two inches for the chisel point;
   (b) about two to about six inches at the connection between said penetrating chamfer and said slicing edge;
   (c) about five to about seventeen inches at the connection between said slicing edge and said chopping chamfer; and
   (d) about seven to about twenty-one inches at the top portion of said upper portion.

10. A hand-manipulated dirt tool for making an opening in, chopping, and removal of soil from the ground by directly hand guiding the tool, comprising:

(A) a vertically extending handle having a grip positioned about one end thereof whose opposite end is fixedly engaged with a spine forming part of a working piece;

(B) said working piece comprising a spine, an upper portion, a middle portion, and a lower portion:

(i) said spine being centrally located and aligned along a vertical line of said working piece for fixedly receiving said handle, wherein said spine extends downwardly into said working piece at least a third of the length of the working piece;

(ii) said upper portion extending upwardly from said middle portion and defining a chopping chamfer consisting of a pair of side edges, each side edge extending upwardly and outwardly from the respective side edges of said middle portion at an angle of from about thirty degrees to about seventy degrees relative to a horizontal line perpendicular to the vertical line of said working piece; said upper portion further consisting of a top portion defining a horizontally extending foot rest located about the top of each of said side edges;

(iii) a bottom portion connected to said middle portion and defining a penetrating chamfer having a pair of side edges, each extending upwardly and outwardly at an angle of about thirty degrees to about seventy degrees relative to a horizontal line perpendicular to the vertical line of said working piece, from an entry portion located at the bottom of said working piece; said entry portion defining a chisel point for making initial contact with entry into, and making an opening in the soil;

(iv) a middle portion disposed between and connected with said upper portion and said bottom portion of said working piece, said middle portion defining a slicing edge consisting of a pair of side edges, each located on either side of said spine and extending upwardly and outwardly from the side edges of said penetrating chamfer to the side edges of said chopping chamfer at an angle of from about thirty degrees to about eighty five degrees relative to a horizontal line perpendicular to the vertical line of said working piece;

(C) wherein (i) each of the side edges of said penetrating chamfer, slicing edge and chopping chamfer are continuous and directed outwardly from the vertical line of said working piece; and (ii) the widest width of said upper portion is greater than the widest width of said middle portion, and the widest width of said middle portion is greater than the widest width of said lower portion; and (D) said working piece and the spine define a side profile configuration that is curvilinear such that the working piece and spine curve outwardly away from the handle from the upper portion to the bottom portion of the working piece.

11. The hand-manipulated dirt tool of claim 10, wherein the dirt tool is selected from the group consisting of a spade, a shovel, and a post hole digger.

12. The hand-manipulated dirt tool of claim 10, wherein the height of said chopping chamfer being about one-half inch to about three inches.

13. The hand-manipulated dirt tool of claim 10, wherein the height of said penetrating chamfer being about one-half inch to about three inches height.

14. The hand-manipulated dirt tool of claim 10, wherein the height of said slicing edge being about six inches to about twenty four inches.

15. The hand-manipulated dirt tool of claim 10, wherein the ratio of the widest width of said upper portion to the total height of said working piece is from 0.7 to 1.0.

16. The dirt tool of claim 10, wherein
(a) said side edges of said penetrating chamfer extend upwardly and outwardly at an angle of about forty-five degrees;
(b) said side edges of said slicing edge extend upwardly and outwardly from the side edges of said penetrating chamfer at an angle of about seventy-five degrees;
and (c) said side edges of said chopping chamfer extend upwardly and outwardly at an angle of about forty-live degrees.

17. The dirt tool of claim 10, wherein said dirt tool comprises at least two parallel chamfers having the same angularity.

18. The dirt tool of claim 10, wherein the width dimensions of the working piece are as follows:
(a) about two to about six inches at the connection between said penetrating chamfer and said slicing edge;
(b) about live to about seventeen inches at the connection between said slicing edge and said chopping chamfer; and
(c) about seven to about twenty-one inches at the top portion of said upper portion.

19. The dirt tool of claim 10, wherein the horizontal width of the chisel point is linear.

20. The dirt tool of claim 10, wherein the horizontal ends of said chisel point make about a forty-five degree angle with the side edges of its adjacent penetrating chamfer.

21. The dirt tool of claim 10 wherein said chisel point is curved.

* * * * *